United States Patent [19]

Gold

[11] Patent Number: 5,489,354

[45] Date of Patent: Feb. 6, 1996

[54] AUTO WINDSHIELD INSTALLATION METHOD

[76] Inventor: Peter Gold, 465 N. Wood Rd., Rockville Centre, N.Y. 11570

[21] Appl. No.: 440,831

[22] Filed: May 15, 1995

[51] Int. Cl.⁶ .............................. B62D 27/00; B60J 1/00
[52] U.S. Cl. ...................... 156/108; 296/93; 296/146.15; 296/201; 52/204.597
[58] Field of Search .............................. 156/108; 296/93, 296/146.15, 201, 96.21; 52/208, 204.597

[56] References Cited

U.S. PATENT DOCUMENTS 5,009,462  4/1991  Katcherian .

Primary Examiner—Michael W. Ball
Assistant Examiner—Sam Chuan Yao

[57] ABSTRACT

A two-stage method of affixing an elastomeric molding about the peripheral edge of an auto windshield, the first stage being non-adhesively by engaging the two top corners of the windshield in notches provided for this purpose in the depending leg of the molding, and the second stage being adhesively using previously deposited urethane in the gap between the windshield with molding and the slightly oversized auto windshield opening, wherein the first stage affixation enables the molding to protect the windshield edge from chipping or like damage, and the second stage affixation bonds the windshield permanently in place.

1 Claim, 1 Drawing Sheet

AUTO WINDSHIELD INSTALLATION METHOD

FIELD OF THE INVENTION

The present invention relates generally to the installation of an auto windshield under hermetically sealed conditions using a known extruded elastomeric molding affixed about the peripheral edge of the windshield, and more particularly to improvements in pre-installation affixation of the molding to the windshield to obviate chipping and like damage to the windshield edge as might otherwise result during handling of the windshield.

BACKGROUND OF THE INVENTION

As the name implies, an "insert" molding is inserted in the gap between a windshield seated in a slightly oversized auto windshield opening so that a depending leg of the molding is engaged by previously deposited adhesive, such as urethane, to permanently bond the windshield in place, all as exemplified by U.S. Pat. No. 4,850,640 issued to Peter N. Gold for Auto Window Moulding on Jul. 25, 1989.

Also in use, and similarly functionally named is a "gripper" molding, as described in U.S. Pat. No. 5,009,462 issued to Ricky V. Katcherian for Window Reveal Molding on Apr. 23, 1991 which has an inboard crown overhang and an inboard extending leg spaced apart to receive in a friction fit therebetween the peripheral edge of the windshield prior to the combination windshield/molding being positioned for adhesive bonding to an auto flange which bounds the auto windshield opening.

Thus, the "insert"-type molding is, during the adhesive bonding phase of the installation, easier to use, but prior thereto of no utility in the handling of the windshield, and the "gripper"-type molding of significant utility prior to the adhesive bonding, but tedious and time-consuming to use because of the requirement of effectuating a friction fit between the molding and windshield peripheral edge.

Broadly, it is an object of the present invention to provide an "insert"-type molding having pre-installation utility overcoming the foregoing and other shortcomings of the prior art.

More particularly, it is an object to achieve a non-adhesive affixation of an "insert" molding to the windshield peripheral edge to thereby provide the attendant utility of a "gripper" molding thereto, but in a significantly facilitated manner noteworthy in obviating any need of a friction fit, all as will be better understood as the description proceeds.

BRIEF DESCRIPTION OF THE DRAWINGS

The description of the invention which follows, together with the accompanying drawings should not be construed as limiting the invention to the example shown and described, because those skilled in the art to which this invention appertains will be able to devise other forms thereof within the ambit of the appended claims.

DESCRIPTION OF THE PREFERRED EMBODIMENT

Figure 6:
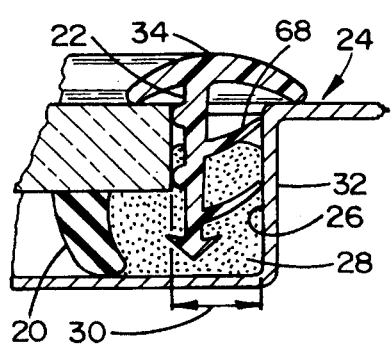
FIG. 6 is an enlarged scale sectional view taken along line 66 of FIG. 5.
Figure 7:
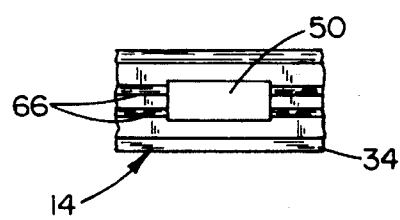
FIG. 7 is a partial bottom view as seen in the direction of line 7—7 of FIG. 1 showing details of the notch of the molding depending leg.

As well known, to provide a weather barrier seal and for other beneficial reasons, an auto front windshield 10 has positioned about its peripheral edge 12 an extruded elastomeric molding 14 of a type having a T-shape in cross section formed by a top crown 16 from which there extends a depending leg 18, the peripheral edge 12 supported on a dam 20 being projected, as best illustrated in FIG. 6, into one juncture 22 of the crown and leg 16, 18, and an auto body angled flange 24 being positioned beneath the crown 16 on the other side of the leg 18.

For permanent affixation of the molding 14 to the windshield 10 to each other and this combination 10, 14 to the angled auto flange 24 which bounds the auto windshield opening 26, use is made of urethane 28 deposited in a gap 30 between the windshield 10 which is slightly undersized in relation to the size of the windshield opening 26 bounded by the vertical wall 32 of the angled flange 24.

Typically, although by design not in this case, the windshield 10 on the dam 20 is installed in the auto windshield opening 26, urethane 28 deposited in the gap 30 between the windshield peripheral edge 12 and flange wall 32, and then the molding 14 is inserted into the gap 30 so that the depending leg 18 thereof is urged into the adhesive or urethane deposit 28 and, upon the curing of the urethane, about the leg 18, the windshield and molding 10, 14 is held permanently in place and is hermetically sealed.

Preferably, in the interval before a replacement windshield, such as the windshield 10 hereof is installed in an auto windshield opening 26 to replace a defective windshield and even as an OEM (original equipment manufacture) windshield, its peripheral edge 12 should be protected by the molding 14 against inadvertent chipping or like damage, particularly if the interval is lengthy and contemplates handling of the windshield. In such a circumstance, the molding used is not of the insert type as herein described, but is of a gripper type having an inwardly extending leg (not shown) at a clearance location beneath the inboard crown portion 34 to provide a friction fit to the windshield peripheral edge 12. This non-adhesive affixation of a gripper type molding to a windshield peripheral edge is, however, tedious, and is undoubtedly the reason a gripper molding, such as that illustrated and described in U.S. Pat. No. 5,009,462 issued to Ricky V. Katcherian for Window Reveal Molding on Apr. 23, 1991 is not in popular use.

Underlying the present invention is the recognition that a non-adhesive affixation of what typically would be an insert type molding, such as the molding 14 hereof, can be a functioning gripper type molding by using to advantage the urgency of its elastomeric construction material and thereby obviating the tedium of attempting to achieve a friction fit of the windshield between a crown overhang and a cooperating leg.

Figure 1:
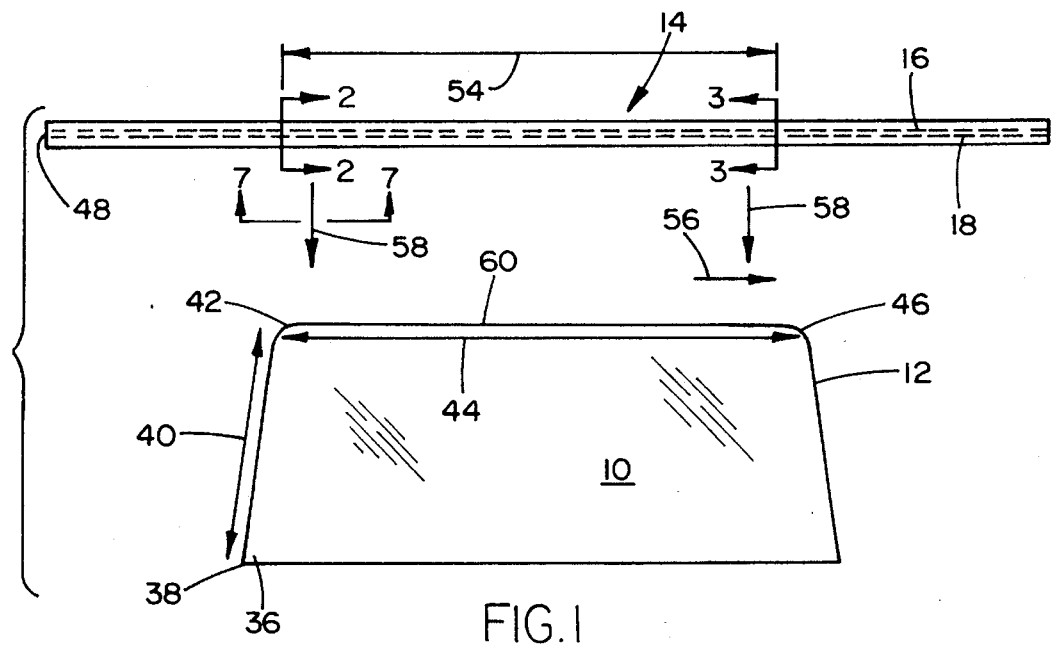
FIG. 1 is a front elevational view of a windshield and of a molding incident to the affixation of the molding about the peripheral edge of the windshield.
Figure 2:
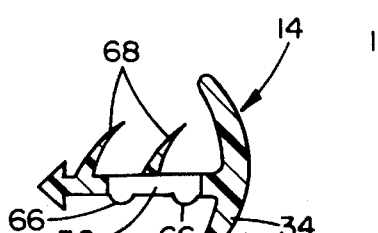
FIGS. 2 and 3 are sectional views, in slightly enlarged scale, of the molding as seen respectively in the direction of the arrows 2—2 and 3—3 of FIG. 1.
Figure 3:
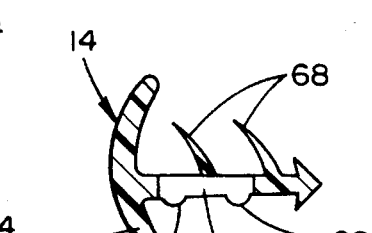
Figure 4:
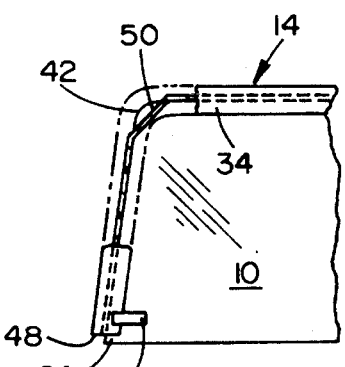
FIG. 4 is a partial front elevational view of a molding affixed non-adhesively to the windshield.
Figure 5:
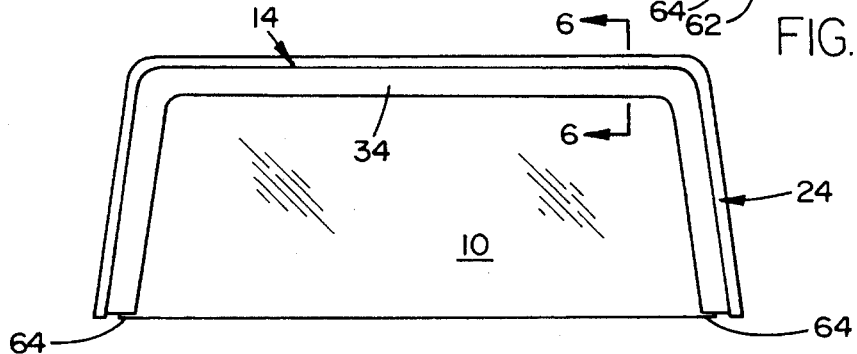
FIG. 5 like FIG. 4 is similarly a front elevational view, but of the molding and windshield of FIG. 4 additionally adhesively affixed to each other.

More particularly, as a first stage of a two-stage method of affixing the molding 14 to the windshield 10, a bottom left hand corner 36 of the windshield 10 is selected as a reference location 38. From location 38, the windshield installer measures or records a distance 40 to a first encountered top corner 42 and a second distance 44 slightly, by a few inches, in advance of the second encountered or other top corner 46. From an end 48 of the molding 14, which end will be positioned at the reference location 38, the installer will mark lengthwise along the molding depending leg 18 locations corresponding to the distances 40 and 44 and, at the marked locations will appropriately embody the depending leg with first and second rectangular notches 50 and 52 respectively. The molding length portion 54 between the notch 50 and notch 52 will be stretched lengthwise, as denoted by arrow 56, to thereby bring into alignment notch 50 with the left top corner 42 and the notch 52 with the right top corner 46, and the stretched molding 54 then lowered, as denoted by the arrows 58, so that corners 42, 46 project through the notches 50, 52, as perhaps can be best understood by the conditions of the left corner and notch 42, 50 denoted in FIG. 4, to thereby establish non-adhesive affixation of the molding 14 along the top edge 60 of the windshield 10 at the juncture 22 of the inboard overhang 34 of the crown 16 and depending leg 18 when, of course, the stretched length portion 54 is released and attempts to return to its unstretched length under the urgency of its elastomeric construction material. The urgency noted has been found in practice to hold molding 14 in place about the peripheral windshield edge 12, and it is recommended that this be aided by hold-down tape 62 adjacent the bottom corners 64.

In storage and until the windshield 10 is installed in an auto windshield opening 26, the non-adhesively affixed molding 14 contributes to facilitated handling of the windshield 10. Permanent installation contemplates adhesive attachment of the dam 20 to the underside of the windshield 10, which optionally could precede the affixation of the molding 14, depositing the viscous uncured urethane 28 in the gap 30, and then inserting the combination windshield 10 and molding 14 into the urethane 28 which seeps between the nubs 66 and the centering fins 68 and, after a known curing interval, hardens to permanently adhesively affix the molding 14 and windshield 10 to each other, and the combination 10, 14 to the auto flange 24.

While the auto windshield molding for practicing the within inventive method, as well as said method herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. For sealing a peripheral edge of a rectangularly shaped auto windshield by a two-stage method of preliminarily non-adhesively and subsequently adhesively affixing about the peripheral edge of said windshield an elastomeric molding of a type having a T-shape in cross section formed by a crown and a depending leg adapted to receive at the juncture therebetween said windshield peripheral edge, said two-stage method of affixing said molding to said windshield comprising the steps of selecting a bottom corner of a bottom edge of said windshield as a reference location, measuring a first distance from said reference location to a first encountered top corner of said windshield and a second distance to a next encountered top corner thereof, marking from an end of said molding said first and second distances therealong, embodying a first notch in said depending leg of said molding at said first distance marking and a second notch a selected nominal distance in advance of said second distance marking, stretching longitudinally a length portion of said molding depending leg between said two notches, aligning said two notches of said stretched molding depending leg with said windshield first and second top corners respectively, and projecting said first and second top corners of said windshield through said first and second notches of said stretched molding depending leg to establish a non-adhesively affixation therebetween under the urgency of the elastomeric construction material of said molding, whereby a subsequent adhesive affixation of said windshield and molding completes the installation of said windshield.

* * * * *